March 24, 1953 O. A. CARNAHAN 2,632,622
VALVE ADAPTED FOR FLOAT OPERATION
Filed Sept. 13, 1948
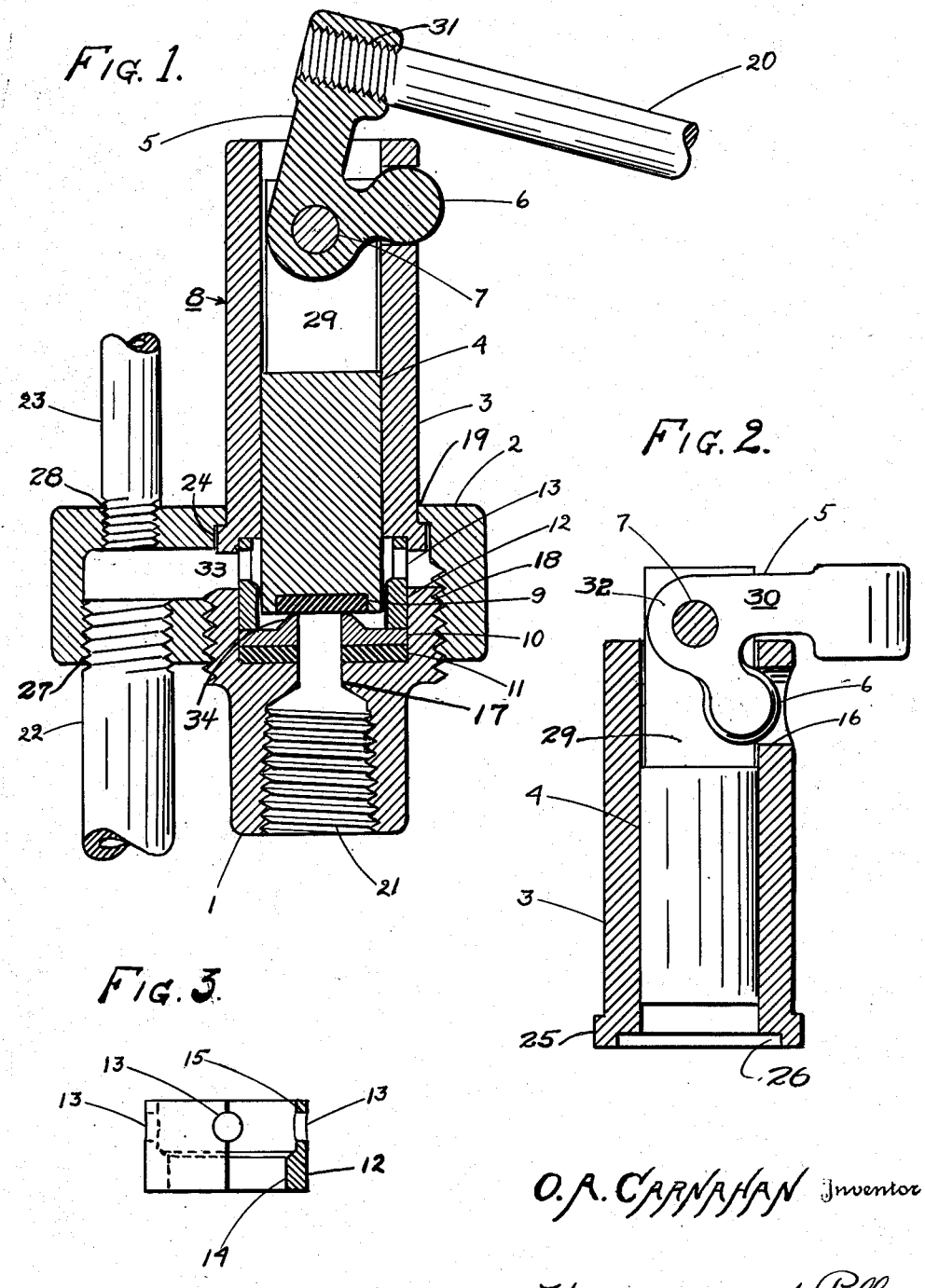
O. A. Carnahan Inventor
By Henninger and Pillars Patented Mar. 24, 1953

2,632,622

UNITED STATES PATENT OFFICE 2,632,622

VALVE ADAPTED FOR FLOAT OPERATION

Orson A. Carnahan, Syracuse, N. Y.

Application September 13, 1948, Serial No. 49,052

4 Claims. (Cl. 251—131)

This invention relates to improvements in valve structures and more particularly to valves adapted for float operation in controlling the admission of water to a tank or other receptacle for flushing toilets, filling stock feeding troughs and the like.

An object of this invention is to provide for a tank an improved valve which will permit rapid filling of the receptacle and which will close quickly and positively when the tank is filled to a predetermined level irrespective of the pressure in the supply line.

Another object of the invention is to reduce erosive deterioration of the elements of the improved float controlled valve by minimizing the water pressure on the valve packing and valve seat during the flow of water through the valve.

Another object of the invention is to provide an improved mechanism wherein the parts are arranged and assembled so as to prevent chattering of the valve stem or plunger in its valve guide even after the valve elements have become worn from long periods of usage.

Another object of the invention is to provide an improved valve mechanism having therethrough a flow passage wherein the velocity head exceeds the discharge head at all points in order to eliminate objectionable noises heretofore associated with such mechanisms.

A further object of the invention is to provide an improved valve mechanism wherein, during closing, the flow of liquid is reduced before the valve comes into contact with its seat, thus reducing wear of the valve seat and packing material.

A further object of the invention is to provide an improved valve which automatically compensates for the wear between the valve stem and its guide, whereby leakage is prevented when the parts become worn.

A still further object of the invention is to provide an improved valve wherein the valve stem and valve packing are maintained in position without the use of screws, bolts, nuts or other threaded locking members.

A still further object of the invention is to provide an improved mechanism which is formed with relatively few parts that may be easily and quickly assembled and disassembled for inspection or replacement of packing material.

The invention also resides in certain novel structural characteristics which facilitate the carrying out of the foregoing objects and which contribute both to the simplicity of the valve and to its ruggedness of construction, as well as to the dependability of its operation.

Other objects and advantages of the invention will become apparent from the following detailed description taken in connection with the accompanying drawings, in which:

Fig. 1 is a cross section of the improved float controlled valve;

Fig. 2 is a view partially in cross section and partially in elevation showing the manner of dismantling the valve actuating mechanism for replacement of packing material; and Fig. 3 is a view partially in cross section and partially in elevation of the auxiliary valve sleeve which is shown in assembled relationship in Fig. 1.

While the invention is susceptible of various modifications and alternative constructions, I have shown in the drawings and will herein describe in detail the preferred embodiment. It is to be understood, however, that I do not intend to limit the invention by such disclosure for I aim to cover all modifications and alternative constructions falling within the spirit and scope of the invention as defined in the appended claims.

The float controlled valve comprises a valve housing 8 which is formed of a valve seat casing 1, a hollow union nut 2 and a tubular valve stem enclosure or guide 3. The valve seat casing 1 is provided with an internally threaded inlet portion 21 to which the water supply pipe (not shown) is connected. A passage 17 extends from the internally threaded inlet portion 21 to the inner chamber 33 of housing 8. Valve seat casing 1 is provided with an enlarged portion on which external threads 18 are formed which co-act with an internally threaded aperture in union nut 2 to form a water-tight seal.

The tubular valve stem enclosure or guide 3 is mounted in an opening 19 formed in a wall of the union nut 2 opposite to the valve seat casing 1. The valve stem guide 3 is preferably mounted with its axis concentrically positioned with respect to the axis of passage 17. Opening 19 is provided with an offset groove 24 in which is positioned a flange 25 formed on one end of tubular valve stem guide 3. The engaging parts of union nut 2 and valve stem enclosure 3 are seated to effect a water-tight seal therebetween in order to prevent leakage of water from the interior of the union nut.

The enlarged portion of valve seat casing 1 is recessed to receive centrally apertured seat gasket 11 and valve seat base 10, the apertures of these elements being in alignment with passage 17. Valve seat base 10 is provided at 34 with a valve seat in the form of a bevelled or conical shoulder. An auxiliary annular valve sleeve 12, best shown in Fig. 3, is positioned within the valve seat casing 1 in engagement with the interior walls of the casing and resting upon valve seat base 10, as shown in Fig. 1. The upper portion of the auxiliary sleeve 12 extends into chamber 33 of valve housing 8. The lower end of the bore of valve stem guide 3 is enlarged at 26, as shown in Fig. 2, to accommodate the end of the auxiliary valve sleeve 12 and to form a water-tight seal between the two parts, when the parts are assembled as shown in Fig. 1. By tightening the valve seat casing 1 in the union nut 2, the valve stem guide 3 is firmly secured in position due to the fact that pressure is transmitted to casing 1 through the auxiliary sleeve 12 which is positioned therebetween.

The lower portion 14 of the auxiliary valve sleeve 12 which surrounds the valve seat 34 is provided with an internal diameter which is slightly greater than the external diameter of the valve stem 4, and there is thus formed around stem 4 an annular chamber of reduced area when the stem is positioned within portion 14. The internal diameter of the upper portion 15 of the valve sleeve is greater than portion 14 and, as indicated by Fig. 3, this part of the sleeve is provided with a plurality of openings 13 positioned in spaced relationship about the sleeve wall. As will later be explained, openings 13 form a part of the flow path for water passing through the valve structure.

The union nut 2 is formed with a sufficiently large diameter to accommodate internally threaded apertures 27 and 28 into which the threaded ends of outlet pipes 22 and 23 are positioned. By this arrangement a passage is formed from the intake opening in casing 1, passage 17, valve seat 34, apertures 13 of auxiliary valve sleeve 12, chamber 33 to the outlet openings 27 and 28. The combined area of the openings 13 in auxiliary valve sleeve 12 is made less than the combined area of the openings in discharge pipes 22 and 23 and greater than inlet passage 17 in valve seat casting 1.

The flow of liquid through the aforedescribed passage is controlled by the operation of valve stem or plunger 4 which is adapted to slidingly engage the interior wall of valve stem guide 3 and to reciprocate within the bore under control of a float-operated valve actuator in the manner below described.

In the closed position of the valve, valve washer 9 of valve stem 4 rests upon valve seat 34. This washer is inset in a recess within the end of valve stem 4 and is preferably formed of leather, cork, rubber or other resilient material. The end of the stem 4 opposite valve washer 9 has a lengthwise slot 29 formed centrally therein in which a cam element 30 is pivotally mounted. As shown in Figs. 1 and 2, cam element 30 is pivotally secured in slot 29 by a hinge pin 7 which passes through aligned apertures in opposite sides of valve stem 4 and an opening in the body portion 32 of cam element 30.

Cam element 30 is provided with a cam arm or lever 5 and a cam 6 which extend in acute angular relationship from the body portion 32 in which the hinge pin aperture is positioned. A float arm 20 is connected to cam lever 5 preferably by coacting threaded portions 31, although other connecting means, such as set screws, locking nuts and the like, may be employed. Cam 6 comprises a projecting member having a generally enlarged and rounded end portion with a convex contour which serves as a cam surface for element 30. Adjacent to the upper open end of the valve stem guide 3, there is provided an aperture 16 in which the cam 6 is movably positioned, so that the peripheral surfaces of aperture 16 serve as a cam follower for the cam surfaces of cam element 30.

Movement of cam element 30 about hinge pin 7 results in a camming action between the surface of cam 6 and the interior edge of aperture 16, and as a result thereof, valve stem 4 is reciprocated within valve stem guide 3. It will be understood that cam element 30 is oscillated about hinge pin 7 by the buoyant force of a float (not shown) acting through float arm 20 as the water level in a tank or other receptacle is raised or lowered.

The aligned hinge pin apertures in the valve plunger 4 formed on opposite sides of the slot 29 are located slightly off the center line of the plunger. Thus the reaction point of the force transmitted through the cam element 30 and hinge pin 7 will be slightly offset from the force of the water due to the supply pressure in passage 17 which acts along the center line of valve stem 4. As a result a force is set up by the camming action which holds the valve stem 4 against the sidewall of the valve stem guide 3. This force will offset any differences of pressure that may occur between the valve seat 34 and the packing washer 9 due to variations in velocity, even though considerable wear may have occurred between the valve stem 4 and the valve stem guiding housing 3. The action of this force, together with the friction between the cam element 30, hinge pin 7 and valve stem 4, aids in eliminating oscillation of the valve stem within the casing and prevents chattering of the valve, particularly when considerable clearance due to wear exists between the valve stem and its guiding enclosure. It will be apparent that the structure described serves as a self compensating arrangement to prevent leakage and objectionable noises as the parts become worn.

The valve stem and valve may be removed from the valve structure for inspection or replacement of a worn valve washer by removing float arm 20 and rotating cam element 30 to the position shown in Fig. 2. As the valve stem is further moved outwardly from the valve housing, the cam element will turn about hinge pin 7 so that cam arm 5 will be moved over the end of the valve stem guide 3, and cam 6 will clear aperture 16, thus freeing the valve and stem for its removal from the housing. The valve stem 4 may be inserted in operative position in the valve housing by following a reverse procedure.

The operation of my improved float controlled valve will be described in conjunction with the flushing of a toilet. In Fig. 1, the parts are shown in the position which they assume when the flush tank is filled and the toilet is not in operation. In this position no water flows through the valve since valve washer 9 is held against valve seat 34 by the buoyant force of the float acting through float arm 20, cam arm 5, cam 6, hinge pin 7, and valve stem 4. When the toilet is flushed, water will drain from the flush tank permitting the float arm 20 to move downwardly and the valve plunger to be raised by a force equal to the water pressure multiplied by the area of the inlet passage 17. Upon lifting of the valve plunger, water flows from the supply pipe into the bore of the auxiliary valve sleeve 12, moving valve stem 4 upward with a force equal to the water pressure times the area of the valve stem 4. During the period the valve stem 4 remains above seat 10 and within the annular chamber formed by portion 14 of valve sleeve 12, the flow of water is restricted due to the slight difference in value between the external diameter of the stem 4 and internal diameter of portion 14.

As valve stem 4 moves upwardly into portion 15 of auxiliary valve sleeve 12, the water flows from inlet passage 17 into chamber 33 around valve stem 4, through egress openings 13 and then through tube 22 to the flush tank and through tube 23 to the toilet bowl. During the refilling of the tank, the float rises and cam element 30 is rotated by the upward movement of float arm 20. During this movement cam 6 reacts against the edge of hole 16 to force the valve stem 4 back down into the portion 14 of auxiliary valve sleeve 12. The flow of water passing through the annular space between the valve stem 4 and auxiliary valve sleeve 12 is thus restricted as the float arm approaches the upper limit of its travel.

As the valve washer 9 approaches the valve seat 34 to further restrict the rate of flow, the pressure in the auxiliary valve sleeve 12 is reduced and the valve closes as quickly as the entrapped water can flow through the annular space between the stem 4 and the auxiliary valve sleeve 12. It will be noted that the reduction in pressure during the valve closing period serves to prevent wear between the valve seat 34 and packing washer 9, and enables the valve to close quickly and positively irrespective of the pressure in the supply pipe.

By making the combined area of the openings 13 in auxiliary valve sleeve 12 less than the combined area of the openings in discharge pipes 22 and 23 and greater than that of inlet passage 17, objectionable valve noises such as whistling are eliminated, since points are avoided wherein the velocity pressure head exceeds the discharge pressure head.

I claim:

1. In a valve structure, a valve body having a chamber therein formed of a side wall and an end wall, an annular valve sleeve positioned within said chamber formed with a lower portion having a smaller interior diameter than the upper portion thereof, a valve seat supported upon the interior surface of said end wall and positioned within said lower portion, an inlet passage communicating with said valve seat, outlet passage means from said chamber, a valve mounted to move into engagement with said valve seat to close said inlet passage and to move out of engagement therewith to a position within the upper portion of said sleeve, egress openings formed in the upper portion of said sleeve, a tubular guide member having an open end, a cam follower positioned within the wall of and a spaced distance from the open end of said guide member, a valve stem for said valve slidably positioned in said guide, a cam element having a body portion and two arms extending therefrom in angular relationship, a cam surface adjacent to the end of one of said arms, pivot means for rotatably securing the body portion of said cam element to said valve stem with the cam surface of said arm in operative engagement with the cam follower, and means connected to the other of said arms for moving said cam element.

2. In a valve structure, a valve body having a chamber therein, an annular valve sleeve positioned within said chamber formed with a lower portion having a smaller internal diameter than the upper portion thereof, a valve seat positioned within said lower portion, an inlet passage communicating with said valve seat, outlet passage means from said chamber, a valve mounted to move into engagement with said valve seat to close said inlet passage and to move out of engagement therewith to a position within the upper portion of said sleeve, egress openings formed in said sleeve in the upper portion thereof, a tubular guide member having an open end, a cam follower positioned adjacent to the open end of said guide, a valve stem for said valve slidably positioned in said guide, a V-shaped cam element pivotally secured to said valve stem with one arm extending through said open end and the other arm thereof extending into engaging relation with said cam follower, and means connected with said arm which extends through said open end for oscillating said cam element to actuate the valve stem.

3. In a valve structure provided with a valve body having a chamber therein, an inlet passage communicating with said chamber and a valve positioned within said chamber for controlling the communication between said inlet pipe and said chamber, the combination comprising, a tubular guide member having an open end, an aperture formed in the wall of said member positioned adjacent to said open end, a valve stem slidably positioned in said guide, a cam element having a body portion and two arms extending therefrom in acute angular relationship, a cam surface adjacent the extremity of one of said arms, pivot means for rotatably securing the body portion of said cam lever to said valve stem with the cam surface of said arm in engaging relation with the edge of said aperture and the other of said arms extending through the open end of the guide member, and means connected to said other arm for actuating the cam element and valve plunger.

4. In a valve structure provided with a valve body having a chamber therein, an inlet passage communicating with said chamber and a valve positioned within said chamber for controlling the communication between said inlet pipe and said chamber, the combination comprising, a valve stem connected to said valve, an elongated tubular guide member coacting with and surrounding said valve stem and having one end thereof open, an aperture in the wall of said member positioned adjacent to said open end, a V-shaped cam element pivotally secured to said valve stem with one arm extending through said open end and the other arm thereof extending into engaging relation with the wall surface formed by said aperture, and means connected with said arm which extends through said open end of the guide member for moving said cam element.

ORSON A. CARNAHAN.

REFERENCES CITED

The following references are of record in the file of this patent:

UNITED STATES PATENTS

| Number | Name | Date |
| --- | --- | --- |
| 672,835 | Flagg | Apr. 23, 1901 |

(Other references on following page)

UNITED STATES PATENTS

| Number | Name | Date |
|---|---|---|
| 905,426 | Haywood | Dec. 1, 1908 |
| 981,570 | Jones | Jan. 10, 1911 |
| 1,024,751 | Stewart | Apr. 30, 1912 |
| 1,431,701 | Sklaska | Oct. 10, 1922 |
| 2,039,933 | Rupert | May 5, 1936 |
| 2,054,560 | Edgerton | Sept. 15, 1936 |
| 2,088,864 | McGrath | Aug. 3, 1937 |
| 2,089,848 | Hoferle | Aug. 10, 1937 |
| 2,201,095 | Kaufman | May 14, 1940 |
| 2,225,541 | Werner | Dec. 17, 1940 |
| 2,301,176 | Elliott | Nov. 10, 1942 |
| 2,326,544 | Martin | Aug. 10, 1943 |
| 2,344,041 | Hoke et al. | Mar. 14, 1944 |
| 2,374,989 | Funk | May 1, 1945 |
| 2,434,262 | Delany | Jan. 13, 1948 |
| 2,483,163 | Warren et al. | Sept. 27, 1949 |
| 2,497,557 | Reeves | Feb. 14, 1950 |